United States Patent
Ingalls et al.

(10) Patent No.: US 8,208,645 B2
(45) Date of Patent: Jun. 26, 2012

(54) SYSTEM AND METHOD FOR HARMONIZING CALIBRATION OF AUDIO BETWEEN NETWORKED CONFERENCE ROOMS

(75) Inventors: David R Ingalls, Corvallis, OR (US); Scott Grasley, Lebanon, OR (US); William Mcconnell, Benton County, OR (US); Masoud Zavarehi, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1655 days.

(21) Appl. No.: 11/521,635

(22) Filed: Sep. 15, 2006

(65) Prior Publication Data
US 2008/0071861 A1    Mar. 20, 2008

(51) Int. Cl.
*H04R 29/00* (2006.01)
(52) U.S. Cl. .......................... 381/58; 381/59; 381/71.12
(58) Field of Classification Search ........... 381/56, 381/58, 59, 60, 77, 95, 96, 71.12; 379/202.01
See application file for complete search history.

(56) References Cited

U.S. PATENT DOCUMENTS

| | | | | |
|---|---|---|---|---|
| 5,633,939 | A | * | 5/1997 | Kitani et al. ............... 381/106 |
| 5,754,663 | A | * | 5/1998 | Goldfarb ..................... 381/82 |
| 5,844,994 | A | | 12/1998 | Graumann |
| 5,912,964 | A | | 6/1999 | Stelman |
| 6,914,989 | B2 | | 7/2005 | Janse et al. |
| 7,119,829 | B2 | * | 10/2006 | Leonard et al. ............ 348/14.16 |
| 2002/0149672 | A1 | | 10/2002 | Clapp et al. |
| 2006/0032357 | A1 | | 2/2006 | Roovers et al. |
| 2007/0033030 | A1 | * | 2/2007 | Gottesman .................. 704/233 |
| 2007/0286430 | A1 | * | 12/2007 | Thomas et al. ............ 381/71.12 |

FOREIGN PATENT DOCUMENTS

WO  0018099 A  3/2000
WO  WO 01/26272 A2  4/2001

* cited by examiner

*Primary Examiner* — Ahmad Matar
*Assistant Examiner* — Oleg Asanbayev

(57) ABSTRACT

A system and method is disclosed for harmonizing calibration of audio between a plurality of networked conference rooms to enable each networked conference room to have substantially similar audio characteristics by adjusting speaker gain output of an audio signal sent from a calibration location on a network and tuning microphone response received at a calibration location to a calibrated audio source.

21 Claims, 3 Drawing Sheets

US 8,208,645 B2

SYSTEM AND METHOD FOR HARMONIZING CALIBRATION OF AUDIO BETWEEN NETWORKED CONFERENCE ROOMS

BACKGROUND

Since the invention of the telephone people have sought to supplement face to face meetings with conferences from remote locations. With the advent of the internet and the greater availability of broadband communications, it was often assumed that remote conferencing would be the wave of the future. For example, businesses, groups, family, and friends could communicate with each other as if they were in the same room. Ideas and visions could be shared without the need for cross-continent trips by business people or other types of groups.

The realization of this dream, however, has never fully come to fruition. Important business is often still done face to face. Important decisions are often made only after personal communication. And board meetings are usually held around a conference table rather than a group of video or audio conference rooms.

Many reasons exist for the unfulfilled realization of remote conferencing. For example, even with the advancement of broadband data connections and audiovisual presentation equipment, subtle (and not so subtle) variations in acoustical properties within various remote conference locations can lead to differences in how conference participants are perceived. Voices can sound unnatural and communication can seem awkward. Even small acoustical differences between remote conference rooms can be detected by the conference participants which can make communication seem unnatural, causing feelings of isolation and detachment between various participants.

The acoustical and audio variations between the remote conference locations can reduce synergy at meetings, limit the sharing of concepts and ideas, and disrupt the ambiance that people are accustomed to when meeting face to face. Thus, despite the convenience of remote conferencing, the potentially unnatural communication between the remote locations tends to reduce the use of remote conferencing. This is evidenced by the large percentage of people that still spend valuable time and money traveling to meet and communicate personally.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENTS

Subtle physical and acoustical variations in conference rooms can cause communication between remote conference rooms to sound unnatural, potentially reducing the atmosphere gained in a personal meeting. It is possible to attempt to adjust audio settings between two conference rooms to enable the communication to sound more natural. However, the addition of a third conference room, or changes in the original conference rooms, can easily disrupt adjustments in audio settings, causing attempts at adjustment to be limited at best, and often futile over an extended period.

In accordance with one aspect of the invention, it has been recognized that remote conferencing audio equipment can be calibrated to a centralized standard. Calibrating each conference room to this centralized standard allows the addition of extra conference rooms that have also been calibrated to the centralized standard. With each conference room having substantially similar audio calibrations there can be consistency across a large network of conferencing locations. The consistency can substantially reduce audio variations and inconsistencies between conferencing locations. People can communicate in real time over large distances without feeling unnatural or awkward. The consistent audio calibrations can enable people to remotely communicate while feeling as if they are conversing within the same room. This allows remote conferencing to be used for a wider variety of meetings and communication.

Figure 1A:
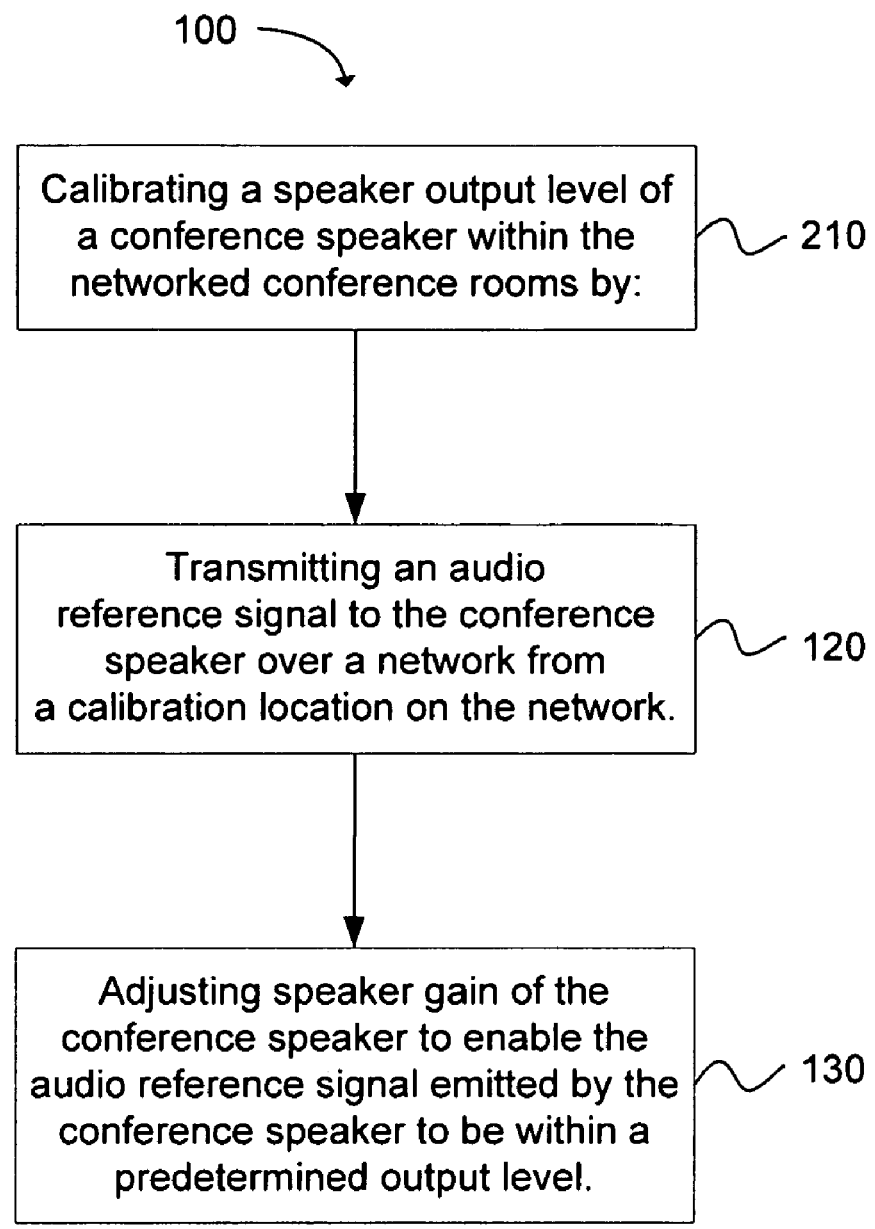
FIG. 1a is a flow chart depicting a method for calibrating a speaker output level of a conference speaker within the networked conference rooms in accordance with an embodiment of the present invention.
Figure 1B:
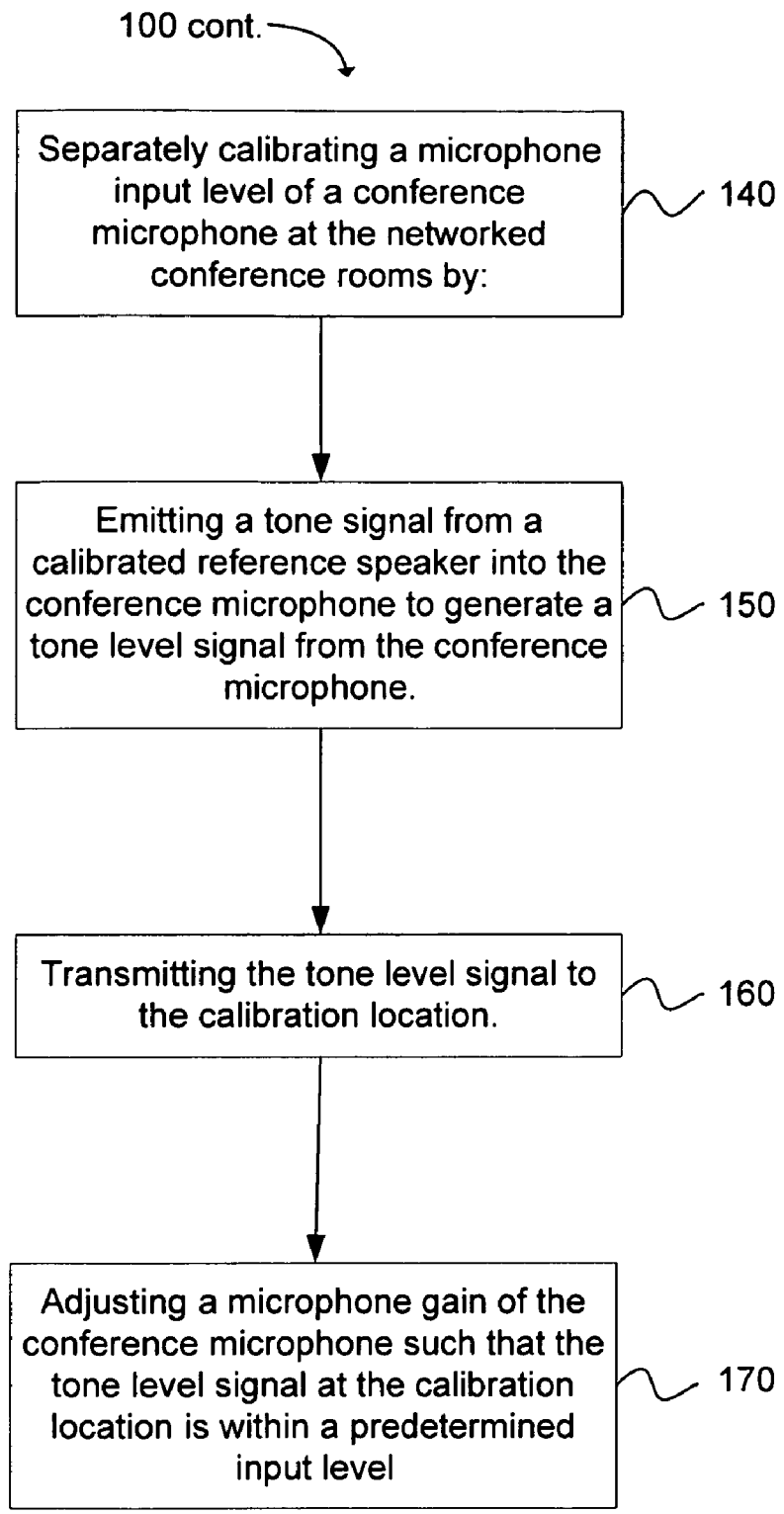
FIG. 1b is a flow chart depicting a method for calibrating a microphone input level of a conference microphone at the networked conference rooms in accordance with an embodiment of the present invention.

FIGS. 1a and 1b provide a flow chart illustrating a method for harmonizing calibration of audio between a plurality of networked conference rooms to enable each networked conference room to have substantially similar audio characteristics, in accordance with an embodiment of the present invention. The method, shown generally at 100 comprises a two step process of calibrating a conference speaker, as shown in block 110 in FIG. 1a, and calibrating a conference microphone, as shown in block 140 in FIG. 1b. The terms conference speaker and conference microphone are intended to refer to speakers and microphones specifically used for conferencing between the networked conference rooms. The networked conference rooms may, of course, include additional speakers and microphones that are not used for conferencing. Likewise, the conference speaker(s) and microphone(s) may be used for both conferencing and non-conferencing activities.

In one embodiment, harmonizing the calibration of audio between the plurality of networked conference rooms can be accomplished by calibrating an audio pipeline 200 between a calibration studio 202 and the conference rooms 206. The audio pipeline can comprise the audio path between the calibration studio and the conference rooms. Calibrating the entire audio path between a remote location, such as the path between the calibration studio and the conference rooms, can enable consistent audio calibrations for each of the conference rooms.

The conference rooms 206 can be coupled to the calibration studio 202 by a network 204. The calibration studio can be located at a location on the network that enables the calibration studio to communicate with each of the conference rooms. The network can be any type of data connection capable of carrying digital or analog calibration signals. For example, the network can be a plain old telephone service (POTS) connection, a broadband cable connection, an optical fiber connection, a digital subscriber line connection, an Ethernet connection in a local area network or wide area network, or other types of networks configured to carry analog signals or data at a sufficient data rate to calibrate the plurality of networked conference rooms.

The method of calibrating a speaker output level of a conference speaker within the networked conference rooms includes the operation of transmitting an audio reference signal to the conference speaker over a network from a calibration location on the network, as shown in block 120 of FIG. 1*a*. For example, the calibration studio 202, shown in FIG. 2, can include a measurement and source generation device 212. The measurement and source generation device can transmit an audio reference signal from the calibration studio to a conference speaker 236 in the conference rooms 206. The conference speaker can then emit the audio reference signal.

The audio reference signal can be configured to enable a standardized measurement of the audio reference signal emitted by the conference speaker. For example, in one embodiment the audio reference signal can be comprised substantially of pink noise. Pink noise has an even distribution of power over a logarithmic scale when measured in octaves. This substantially even distribution enables the human ear to perceive that each octave has a substantially similar volume.

The desired amplitude of the audio reference signal sent from the calibration studio 202, and the desired output level of the conference speaker 236 can be determined, for example, using a so called "golden room". The golden room can be a conference room having a desired configuration and setup. The audio reference signal can be sent from the calibration studio to a conference speaker within the golden room, and the speaker can be adjusted to obtain a desired output level. The output level can be measured and the gain of the conference speaker can be adjusted to a certain level to have a desired output volume. Similarly, a desired gain of the conference microphone can be set within the golden room. The desired speaker output and microphone gain levels that are determined in the golden room can be used to adjust the conference speaker output and conference microphone input (gain) levels using the calibration studio 200, which is in communication with each of the plurality of networked conference rooms, to enable each of the rooms to have substantially consistent audio qualities.

The audio reference signal emitted by the conference speaker 236 in each of the networked conference rooms 206 can be measured using a calibrated audio measurement device such as an audio spectrum analyzer or sound pressure meter. The calibrated audio measurement device can be positioned at a predetermined location within the conference room 206. For example, the calibrated audio measurement device may be located proximate to a center microphone within the conference room. Alternatively, the calibrated audio measurement device may be located on a tripod and placed near the location of a conference participant's ear. Locating the audio measurement device at a similar location within each of the conference rooms enables a substantially similar calibration for the conference speaker in each conference room. The use of pink noise enables the conference speaker to be calibrated to emit the audio reference signal at a predetermined level with a relatively consistent output over at least a portion of the audible frequency range (typically 20 Hz to 20,000 Hz).

The method 100 further includes the operation of adjusting speaker gain of the conference speaker to enable the audio reference signal emitted by the conference speaker to be within a predetermined output level, as shown in block 230 in FIG. 1*a*. The same method can be used to successively calibrate a plurality of conference speakers within each conference room. The calibration of each conference speaker is typically accomplished independent of other conference speakers. Each conference speaker may be calibrated with the calibrated audio measurement device at the same predetermined location. Alternatively, different predetermined locations may be used for different conference speakers. For example, a first speaker may be calibrated relative to the calibrated audio measurement device located next to a first microphone. A second speaker may be calibrated with the calibrated audio measurement device next to a second microphone, and so forth. Calibrating speakers relative to adjacent microphones enables each conference participant positioned next to a microphone to hear audio of similar levels from a conference speaker near that microphone.

The plurality of conference speakers can each be the same type of speaker. Alternatively, different types of speakers can be used within the conference room. For example, speakers having different dynamic frequency ranges, such as a tweeter, midrange speaker, or woofer can be used within the conference room to enable sound to be reproduced over a broad spectrum of the audible bandwidth. In one embodiment, each conference room can include three midrange speakers and a woofer. The woofer can be calibrated to enable the lower frequency sound produced by the woofer to have substantially similar gain as higher frequency sound produced by the midrange speakers. Alternatively, the woofer output can be adjusted to have either a lesser or greater gain than midrange and high frequency output, depending upon a desired use of the conference room.

The audio reference signal can be produced by the measurement and source generation device 212 within the calibration studio 202. A digital audio mixer 214 may be used to alter the audio reference signal to have desired audio properties. For example, the output of the measurement and source generation device may be sent through the digital audio mixer and adjusted to have an output substantially comprising pink noise. The audio reference signal can be output from the measurement and source generation device and/or the digital audio mixer having a predetermined output level. The same output level can be used to calibrate each of the speakers in each of the networked conference rooms.

The audio reference signal can be encoded using a codec 216. The codec can be an off the shelf encoder/decoder configured to encode and decode digital audio. The codec may be used to compress the audio reference signal using either a lossy or lossless type compression. For example, the audio reference signal can have a Moving Picture Expert Group (MPEG) type encoding and compression applied, such as MPEG 1, audio layer 2 type encoding. Alternatively, another type of encoding and/or compression can be used that enables the audio reference signal to be transmitted between the calibration studio 202 and each conference room 206.

The audio reference signal transmitted from the calibration studio 202 to the conference room 206 can be received by a codec 220 configured to decode and/or decompress the audio reference signal. The audio reference signal can be sent through an audio signal processor 224 and through one or more amplifiers 228 to at least one conference speaker 236. The output level of each conference speaker can be calibrated by adjusting the amplifier output or altering the audio reference signal using the audio signal processor. The use of audio signal processor enables the output of each of the conference speakers to be tuned and calibrated over the audible spectrum to have a desired response.

A microphone input level of a conference microphone 232 at each networked conference room 206 can also be calibrated. The conference microphone calibration is separate from the calibration of the conference speaker(s) 236. The conference microphone calibration can be accomplished either before or after the conference speaker calibration is performed. The method 100 provides the additional operation of emitting a tone signal from a calibrated reference speaker into the conference microphone to generate a tone level signal from the conference microphone, as shown in block 150 in FIG. 1b.

Figure 2:
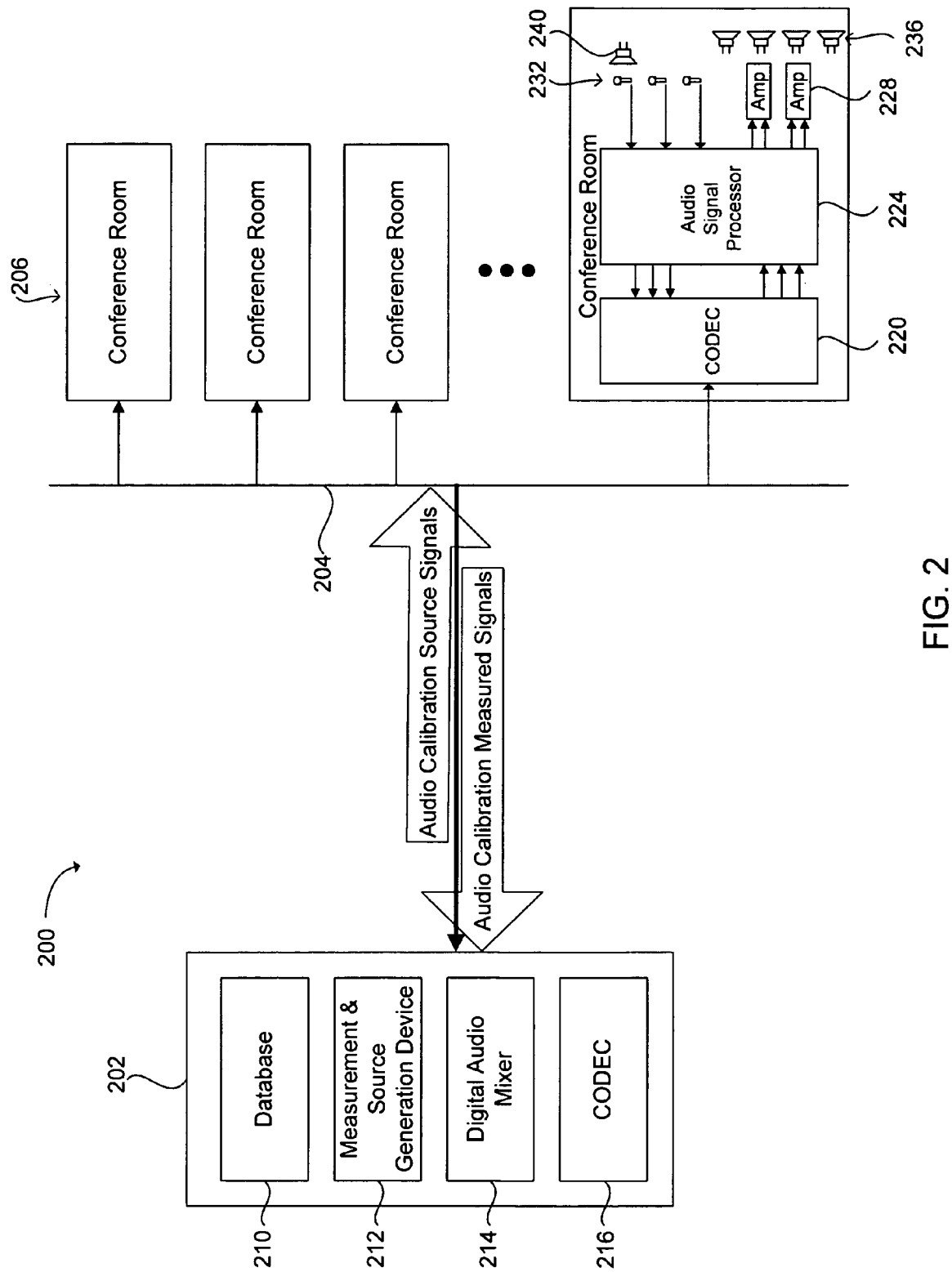
FIG. 2 is a block diagram illustrating a calibration studio configured to harmonize calibration of audio between a plurality of networked conference rooms in accordance with an embodiment of the present invention.

The calibrated reference speaker 240 is a different device than the conference speaker 236, as shown in FIG. 2. The calibrated reference speaker is configured to simulate speech or other types of audio with a calibrated output level. The calibrated reference speaker can also be referred to as a simulated mouth. The calibrated reference speaker can be placed in a similar location as the meeting participant and used to generate one or more types of tones used to calibrate the conference microphone 232. This location is typically proximate to the conference microphone. The conference microphone can convert the output of the calibrated reference speaker to an electronic signal, referred to as a tone level signal.

The method 100 includes the additional operation of transmitting the tone level signal to the calibration location, as shown in block 160 in FIG. 1b. The tone level signal can be transmitted from the conference microphone 232, in FIG. 2, through the audio signal processor 224, to the codec 220 for encoding and/or compression. The encoded/compressed tone level signal can then be transmitted over the network 204 to the calibration studio 202. The audio signal processor in the conference room can be used to alter the tone level signal. For example, the audio signal processor can be used for echo cancellation. However, signal processing such as echo cancellation is typically not applied during calibration.

The calibration location, referred to in block 160 of FIG. 1b, is typically the calibration studio 202. The calibration studio can be connected to the conference room through the network 204. This allows the calibration studio to be located anywhere that network access to the conference room is available.

A further operation of the method 100 includes the operation of adjusting a microphone gain of the conference microphone such that the tone level signal at the calibration location is within a predetermined input level, as shown in block 170 of FIG. 1b. The tone level signal from the conference microphone is received at the calibration station 202 in FIG. 2. The tone level signal can be decoded by the codec 216, altered or amplified by the digital audio mixer 214, and measured and analyzed by the measurement and source generation device 212. The microphone gain can be adjusted until the tone level signal measured at the calibration studio is within predetermined parameters. As previously discussed, the predetermined parameters can be established using a golden room to determine desired levels for the tone level signal.

Each conference room 206 can include a plurality of conference microphones 232. Each conference microphone can be independently calibrated using the calibrated reference speaker 240 and calibration studio 202 connected to each conference room through the network 204.

The use of the calibration studio 202, located independent from each conference room 206, enables consistent standards to be used to calibrate the conference speaker(s) 236 and conference microphone(s) 232 in each conference room. The same audio reference signal can be transmitted from the calibration studio to each of the conference rooms to enable the gain of the conference speaker(s) in each conference room to be adjusted such that the conference speaker(s) output at a substantially similar level. Similarly, the calibrated reference speaker can output a calibrated tone level to adjust the gain of the conference microphone(s) from each conference room such that the tone level signal from each microphone can be received at the calibration studio having a substantially similar amplitude as the tone level signals from microphones in the other networked conference rooms. The consistent audio calibrations can enable people to remotely communicate while feeling as if they are conversing within the same room.

One challenge with performing calibrations of audio equipment is that relatively small changes in environment or room conditions can cause measurable differences in the calibration. For example, shutting curtains in a conference room, moving people, even placement of books, folders, and computers on a desk within the conference room can alter the acoustic characteristics of a room. Determining whether a previously calibrated room is still within calibration limits can be difficult due to changes of acoustical properties of the room. In accordance with another aspect of the invention, it has been recognized that that a networked calibration conference room standard can be determined for each conference room and stored in a database, such as the database 210 in the calibration studio. The calibration standard can be used to remotely determine whether a conference room is still within predetermined calibration limits. Remote adjustment to one or more speakers or microphones that are outside the calibration limits is possible using the stored calibration standard as a reference.

More specifically, after the conference speaker(s) 236 and microphone(s) 232 have been calibrated using the calibration studio 202, a calibration signature can be obtained for the conference room. For example, a standardized audio signal can be transmitted from the calibration studio 202 to the conference speaker(s) in the conference room 206. Each conference speaker can successively output the standardized audio signal and the output of each conference speaker can be successively received by each conference microphone, converted to a signature signal, and sent to the calibration studio. The calibration studio can measure the signature signal for each microphone and store a value for each signal.

In one embodiment, the standardized audio signal can be an acoustical impulse response configured to minimize changes in calibration values due to acoustical changes within the room. One type of acoustical impulse response that can minimize changes in calibration values is an impulse response measured according to the International Organization of Standardization (ISO) 3382 standard for measurement of the reverberation time of rooms with reference to other acoustical parameters. Other types of signals can also be used for the standardized audio signal. Preferably, the standardized audio signal can have a reduced amount of change due to acoustical changes within the conference room caused by physical changes within the room.

In one embodiment, each signature signal received from a conference room can be stored in an M×N array comprising the signature signal values of N speakers and M microphones. For a conference room having three speakers and three microphones, a 3×3 array can be formed, recording the signature signal value of each microphone for each speaker. An example array, shown below, shows the amplitude of the array of signature signals measured in decibels.

| Networked Conference Room Calibration Standard | | | |
|---|---|---|---|
|  | Microphone 1 | Microphone 2 | Microphone 3 |
| Speaker 1 | 4.2 | 4.4 | 4.6 |
| Speaker 2 | 4.3 | 4.5 | 4.8 |
| Speaker 3 | 4.1 | 4.3 | 4.7 |

A networked conference room calibration standard, comprising the array of tone level signals, can be stored for each conference room. The array can be stored on the network 204. In one embodiment, the array can be stored in a database 210 in the calibration studio 202. The database can then be accessed at a later time and used to check a calibration of a selected conference room.

The array provides a useful tool to determine if a conference speaker or conference microphone calibration is outside predetermined calibration limits, even when physical changes within a conference room have altered the signature signal values. For example, a selected networked conference room calibration standard can be periodically verified by comparing a newly measured array of signature signal values from each conference microphone for each of the conference speakers in a selected conference room. It is possible that changes within the conference room have caused changes in the signature values between the two calibrations. However, signature values for a selected conference microphone that are compared across several speakers can show a trend. For example, the signature values of speakers 1, 2, and 3 from microphone 2 in the newly measured array may each be about 2.5 decibels (dB) lower than was recorded in the database for the networked conference room calibration standard. Thus, it can be determined that the gain on microphone 2 likely needs to be increased by about 2.5 dB.

Similarly, the output of a selected speaker may have substantially similar changes when the newly measured array of signature level signals are compared with the networked conference room calibration standard for the selected conference room. For example, the output of speaker 3 may be about 3.5 dB greater as recorded by microphones 1, 2, and 3. The gain of speaker 3 can likely be reduced by 3.5 dB to enable the speaker to be within the original calibration limits.

Thus, the array can be used to remotely check a calibration of a conference room and to make adjustments to speakers or microphones when the signature values are substantially similar throughout at least a portion of the array. The larger the number of speakers and microphones that are in a conference room, the more accurately the array can be used to remotely adjust the calibration of the conference room to be within the initial calibration limits that were recorded after a manual calibration. Of course, if substantially different values are recorded throughout the array, with no visible trend, it may be necessary to perform another manual calibration.

Performing an initial calibration and maintaining the calibration using the array and the calibration studio 202 can be accomplished with the assistance of software. The software can include drivers to operate the database 210, the measurement and source generation device 212, the digital audio mixer 214 and the codec 216 in the calibration studio. Software can also provide a graphical user interface to interact with the calibration studio and to communicate over the network to each conference room 206. Software can similarly be used within the conference room to control the codec 220, the audio signal processor, the conference microphone(s) 232, and the conference speaker(s) 236. Software can be used to remotely control the conference microphone gain and the conference speaker gain to enable the devices to be remotely calibrated.

The use of the array provides a significant improvement by enabling the audio calibration of a plurality of networked conference rooms to be periodically verified and corrected. The array enables corrections to calibration levels of microphones and speakers that change after an initial calibration while accounting for possible changes due to physical and environmental changes within a conference room. The ability to verify and correct conference room audio calibrations allows each of the plurality of conference rooms to retain substantially similar audio characteristics over time to allow conference participants to meet and interact as if they were within the same room.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for harmonizing calibration of audio between a plurality of networked conference rooms, comprising:
    a) calibrating a speaker output level of conference speakers within each networked conference room of the plurality of networked conference rooms by:
        (1) transmitting an audio reference signal to each conference speaker over a network from a calibration studio on the network; and
        (2) adjusting a speaker gain of each conference speaker to enable the audio reference signal emitted by each conference speaker to be within a predetermined output level;
    b) separately calibrating a microphone input level of conference microphones within each networked conference room of the plurality of networked conference rooms by:
        (1) emitting a tone signal from a single calibrated reference speaker, different from the conference speakers, within each networked conference room of the plurality of networked conference rooms into each conference microphone to generate a tone level signal from each conference microphone;
        (2) transmitting each tone level signal from the plurality of networked conference rooms to the calibration studio; and
        (3) adjusting a microphone gain of each conference microphone such that the tone level signal at the calibration studio is within a predetermined input level.

2. A method as in claim 1, further comprising successively transmitting a standardized audio signal from the calibration studio over the network to the conference speaker within each networked conference room of the plurality of networked conference rooms to enable each successive conference speaker to emit the standardized audio signal.

3. A method as in claim 2, further comprising detecting the emitted standardized audio reference signal from each successive conference speaker with each successive conference microphone within each networked conference room of the plurality of networked conference rooms to form an array of signature signals, wherein the array of signature signals comprises a measurement of the standardized audio signal of each successive conference speaker by each successive conference microphone within each networked conference room of the plurality of networked conference rooms.

4. A method as in claim 3, further comprising storing the array of signature signals for each networked conference room of the plurality of networked conference rooms in a database located on the network to form a networked conference room calibration standard for each networked conference room of the plurality of networked conference rooms.

5. A method as in claim 4, further comprising periodically verifying a selected networked conference room calibration standard by comparing a newly measured array of signature signals for a selected networked conference room of the plurality of networked conference rooms with the networked conference room calibration standard for the selected networked conference room.

6. A method as in claim 5, further comprising adjusting a conference speaker gain or conference microphone gain when a calibration difference between signature signals in the newly measured array and the networked conference room calibration standard is greater than a predetermined calibration difference amount.

7. A method as in claim 6, further comprising adjusting the conference speaker gain by the calibration difference when the calibration difference for the conference speaker, as measured by the conference microphone within the same networked conference room, is the same across the conference speakers within the same networked conference room.

8. A method as in claim 6, further comprising adjusting the conference microphone gain by the calibration difference when the calibration difference for the conference microphone, as measured by the conference speaker within the same networked conference room, is the same across the conference microphones within the same networked conference room.

9. A method as in claim 1, wherein transmitting the audio reference signal further comprises transmitting the audio reference signal to the conference speaker, wherein the audio reference signal is configured to enable the conference speaker to emit pink noise.

10. A system for harmonizing calibration of audio between a plurality of networked conference rooms, comprising:
    a calibration studio coupled to a network;
    a conference speaker within each networked conference room of the plurality of networked conference rooms, said conference speaker configured to emit an audio reference signal transmitted from the calibration studio over the network to the conference speaker;
    a sound pressure meter within each networked conference room of the plurality of networked conference rooms, said sound pressure meter configured to measure the audio reference signal emitted by the conference speaker to enable speaker gain of the conference speaker to be adjusted until the emitted audio reference signal is within a predetermined output level;
    a conference microphone located within each networked conference room of the plurality of networked conference rooms;
    a single calibrated reference speaker, different from the conference speaker, within each networked conference room of the plurality of networked conference rooms, configured to emit a calibrated reference tone into the conference microphone to generate a tone level signal from the conference microphone; and
    wherein the calibration studio is further configured to receive and measure a level of the tone level signal emitted from the conference microphone within each networked conference room of the plurality of networked conference rooms to enable a microphone gain of the conference microphone to be calibrated to within a predetermined input level.

11. A system as in claim 10, wherein the calibration studio further comprises a codec configured to encode the audio reference signal prior to transmitting and decode the received tone level signal.

12. A system as in claim 10, wherein the calibration studio is further configured to emit an audio reference signal comprised of pink noise.

13. A system as in claim 10, further comprising a plurality of M conference microphones and a plurality of N conference speakers within each networked conference room of the plurality of networked conference rooms.

14. A system as in claim 13, further comprising a networked conference room calibration standard for each networked conference room of the plurality of networked conference rooms, comprising an M times N array of measurements comprising successive measurements of a standardized audio output of each of the plurality of N conference speakers by each of the plurality of M conference microphones within each networked conference room.

15. A system as in claim 14, further comprising a calibration check, wherein a calibration check measurement comprises an M times N array of measurements comprising successive measurements of the standardized audio output of each of the plurality of N conference speakers by each of the plurality of M conference microphones within each networked conference room.

16. A system as in claim 15, wherein the microphone gain of a calibration checked microphone is adjusted when a calibration checked microphone gain changes more than a predetermined amount from the networked conference room calibration standard.

17. A system as in claim 15, wherein the calibration studio is configured to adjust the microphone gain of the calibration checked microphone when the calibration checked microphone gain in the calibration check has substantially the same change in measurement of each conference speaker within the plurality of N conference speakers when compared with the networked conference room calibration standard.

18. A system as in claim 15, wherein the speaker gain of a calibration checked speaker is adjusted when the calibration checked speaker gain changes more than a predetermined amount from the networked conference room calibration standard.

19. A system as in claim 15, wherein the calibration station is configured to adjust the speaker gain of the calibration checked speaker when the calibration checked speaker gain in the calibration check has substantially the same change in measurement by each conference microphone within the plurality of M conference microphones when compared with the networked conference room calibration standard.

20. A method of making a harmonized calibration system having a standardized audio calibration, comprising:
    a) providing a plurality of networked conference rooms;
    b) calibrating a speaker output level of conference speakers within each networked conference room of the plurality of networked conference rooms by:
        (1) transmitting an audio reference signal to the conference speakers over a network from a calibration studio on the network; and
        (2) adjusting a speaker gain of the conference speakers to enable the audio reference signal emitted by the conference speaker to be within a predetermined output level;

c) separately calibrating a microphone input level of conference microphones within each networked conference room of the plurality of networked conference rooms by:
  (1) placing a single calibrated reference speaker, different from the conference speaker, proximate to the conference microphones;
  (2) emitting a tone signal from the calibrated reference speaker within each networked conference room of the plurality of networked conference rooms into each conference microphone to cause each conference microphone to generate a tone level signal;
  (3) transmitting each tone level signal from the plurality of networked conference rooms to the calibration studio; and
  (4) adjusting a microphone gain of each conference microphone such that the tone level signal at the calibration studio is within a predetermined input level.

21. A non-transitory computer usable storage medium having computer readable program code embodied therein for harmonizing calibration of audio between a plurality of networked conference rooms, the computer readable program code in a computer program product comprising:
  a) calibrating a speaker output level of conference speakers within each networked conference room of the plurality of networked conference rooms using:
    (1) instructions for transmitting an audio reference signal to each conference speaker over a network from a calibration studio on the network; and
    (2) instructions for adjusting speaker gain of each conference speaker to enable the audio reference signal emitted by each conference speaker to be within a predetermined output level;
  b) separately calibrating a microphone input level of conference microphones within each networked conference room of the plurality of networked conference rooms using:
    (1) instructions for emitting a tone signal from a single calibrated reference speaker, different from the conference speakers, into each conference microphone to generate a tone level signal from each conference microphone;
    (2) instructions for transmitting the tone level signal to the calibration studio; and
    (3) instructions for adjusting a microphone gain of each conference microphone such that the tone level signal at the calibration studio is within a predetermined input level.

* * * * *